(No Model.) 2 Sheets—Sheet 1.
B. F. HAMILTON.
SWIVEL TRUCK FOR ELECTRIC RAILWAYS.
No. 365,340. Patented June 21, 1887.
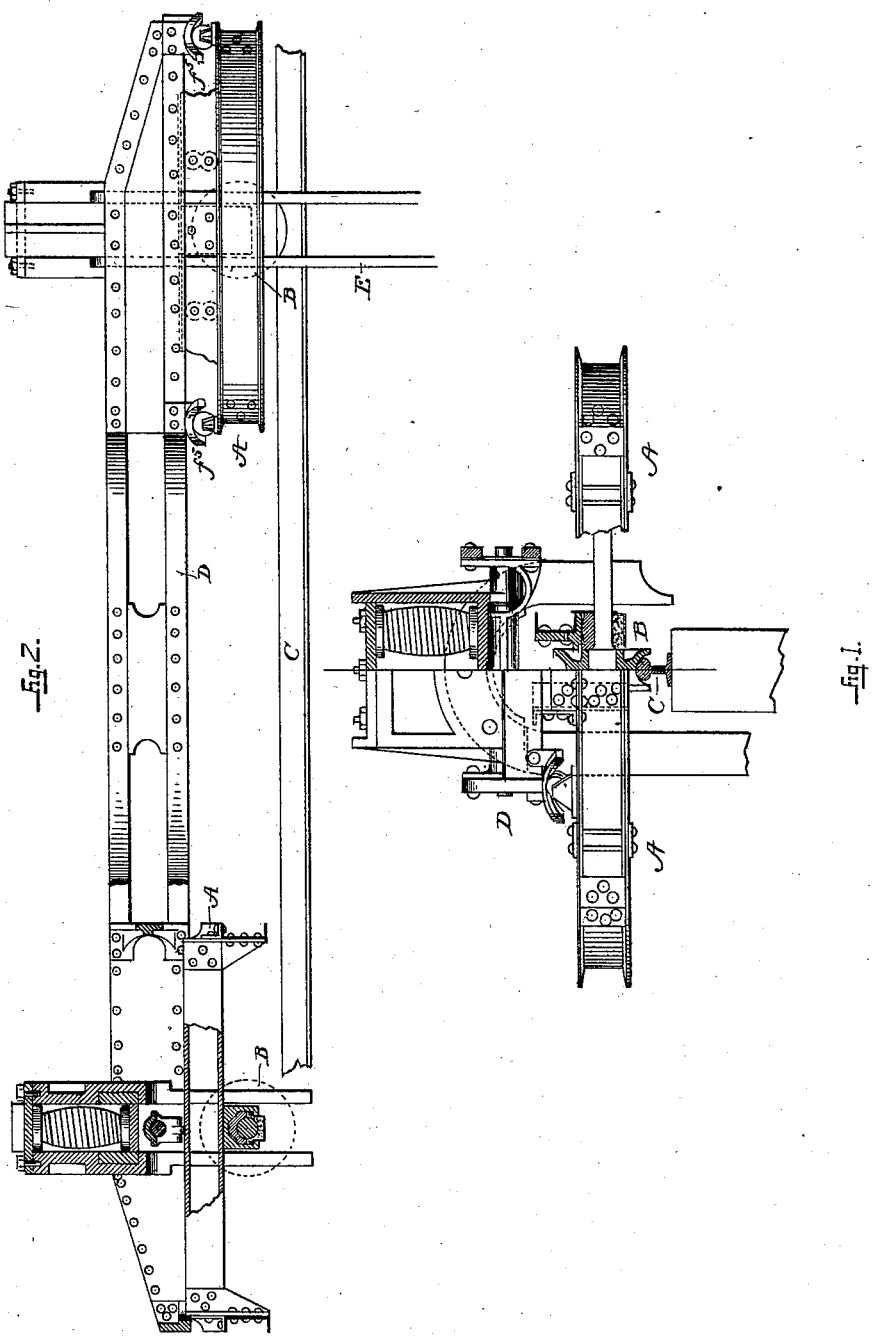
Witnesses:
Inventor:
Benj. F. Hamilton,
by
his Attorney.

(No Model.) 2 Sheets—Sheet 2.
B. F. HAMILTON.
SWIVEL TRUCK FOR ELECTRIC RAILWAYS.
No. 365,340. Patented June 21, 1887.
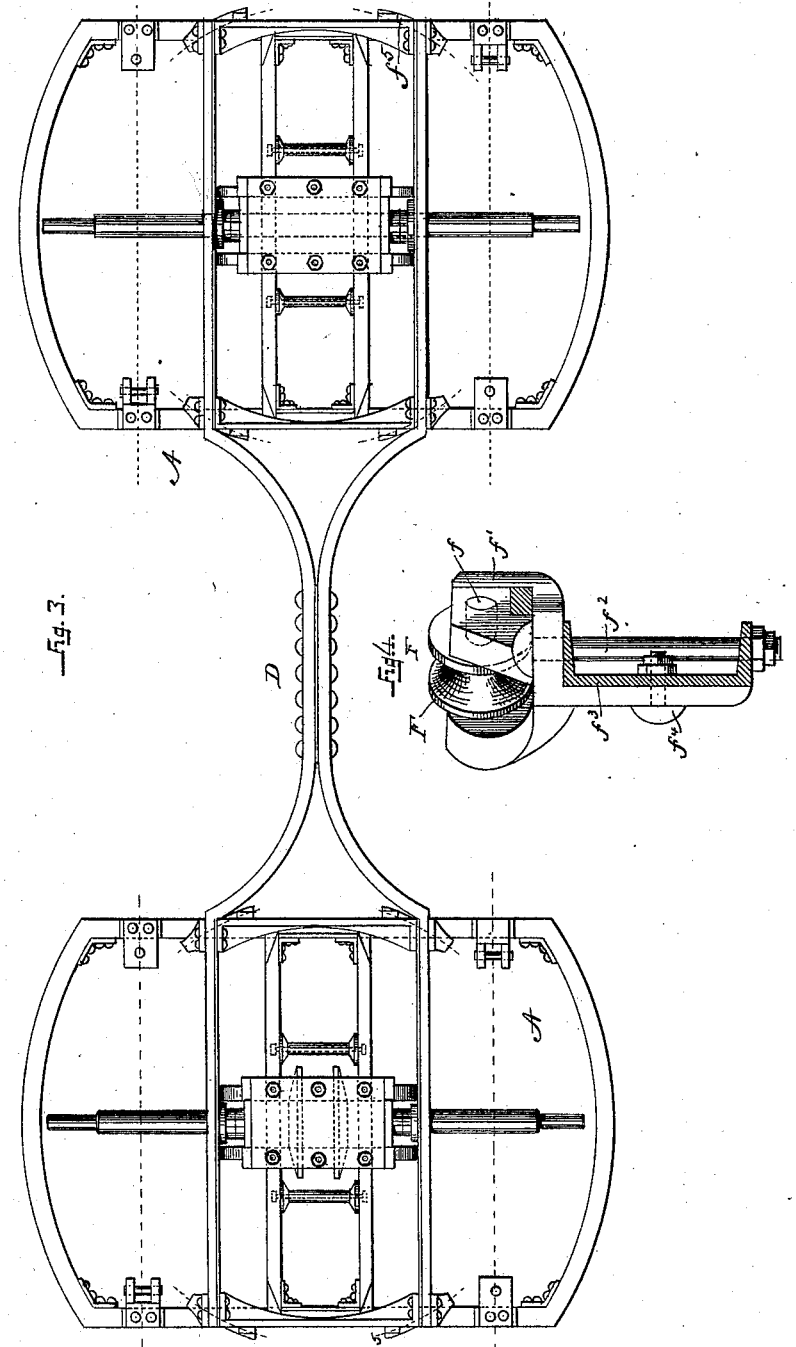
Witnesses:
Inventor:
Benj. F. Hamilton,
by
his Attorney.

UNITED STATES PATENT OFFICE.

BENJAMIN F. HAMILTON, OF BOSTON, MASSACHUSETTS, ASSIGNOR TO THE ENOS ELECTRIC RAILWAY SUPPLY COMPANY, OF SAME PLACE.

SWIVEL-TRUCK FOR ELECTRIC RAILWAYS.

SPECIFICATION forming part of Letters Patent No. 365,340, dated June 21, 1887.

Application filed November 11, 1886. Serial No. 218,534. (No model.)

*To all whom it may concern:*

Be it known that I, BENJAMIN F. HAMILTON, a citizen of the United States, residing at Boston, in the county of Suffolk and State of Massachusetts, have invented certain new and useful Improvements in Swivel-Trucks for Electric Railways; and I do hereby declare the following to be a full, clear, and exact description of the invention, such as will enable others skilled in the art to which it appertains to make and use the same.

This invention relates to trucks for use in elevated railways of that class in which the motor is mounted upon a truck moving upon a single elevated rail and the car is suspended by means of a hanger depending from such truck.

The object of the invention is to produce a truck of such construction that curves and inequalities in the track will be so compensated for that danger of derailment or jarring of the car will be obviated.

Furthermore, the object of the invention is to produce a truck having that portion to which the hangers are attached so arranged as to remain in practically the same position at all times.

With these objects in view my invention resides, essentially, in a truck for railways of the kind described, consisting of two sections, to one of which is attached the wheels bearing upon the supporting-track, and an upper section connected to the lower section by a swiveled joint in such manner that that portion bearing the wheel is capable of moving in proper direction to prevent jarring or undue motion in passing over inequalities in the track or around curves, while the upper portion, to which the hangers supporting the cars are attached, will remain in practically the same position at all times.

I have illustrated the invention in the accompanying drawings, in which—

Figure 1 is an end elevation of my improved truck partly in section. Fig. 2 is a side elevation. Fig. 3 is a plan view, and Fig. 4 is a detail view of the swiveled connection.

In the drawings, A represents the base portions of a truck, upon which are mounted the supporting-wheels B, provided upon their peripheries with grooves, which are entered by the supporting-track upon which the wheels bear. Two of these sections are preferably used, one arranged beneath each end of an upper section, D, to which are attached hangers E, to the lower ends of which are connected the cars which are designed to be supported by the trucks.

It is desirable that the upper portion, D, of the truck should remain as nearly as possible in one position at all times, and should be subjected to no jars, no matter what may be the form of the track over which the trucks pass; and therefore I connect the sections B and D by a swiveled connection of such form that the section B, which carries the supporting-wheels, may turn to adapt itself to the form of the track without in any way disturbing the position of the upper portion. To accomplish this I utilize the swiveled connection shown more clearly in Fig. 4 of the drawings. This consists of the grooved wheel F, mounted upon a shaft, $f$, secured in a bracket, $f'$, which is attached to the upper end of a standard, $f^2$. This standard $f^2$ is placed in suitable sockets in the lower frame, B, and is secured therein by means of a bracket, $f^3$, and screw $f^4$.

The under side of the principal portion of the truck is provided at each end with two plates having curved sockets, $f^5$. These plates $f^5$ are of such length as to allow such movement of the wheels F as will be necessary in order that the lower portion, B, of the truck may move to adapt itself to the form of the track without disturbing the position of the upper portion.

From the foregoing it will be clear that the supporting-wheel of the truck will be free to move from side to side, as may be required in going around curves, &c., without in any way disturbing the position of the upper portion of the truck, to which the hanger supporting the car is attached.

Having thus fully described my invention, what I claim as new, and desire to secure by Letters Patent, is—

A truck for railways of the kind described, consisting of two sections, one bearing the supporting-wheels and the other resting thereon, supporting the hangers to which the cars are attached and connected to the lower portions by swiveled connections, substantially as and for the purpose set forth.

In testimony whereof I affix my signature in presence of two witnesses.

BENJ. F. HAMILTON.

Witnesses:
FRANK D. ALLEN,
CLARENCE J. MESSER.